(12) United States Patent
Minola

(10) Patent No.: US 8,961,643 B2
(45) Date of Patent: Feb. 24, 2015

(54) FLUID FILTER, IN PARTICULAR FOR PETROCHEMICAL PLANT GAS

(75) Inventor: Paolo Minola, Peschiera Borromeo (IT)

(73) Assignee: SAIPEM S.p.A., San Donato Milanese (IT)

( * ) Notice: Subject to any disclaimer, the term of this patent is extended or adjusted under 35 U.S.C. 154(b) by 645 days.

(21) Appl. No.: 13/263,656

(22) PCT Filed: Apr. 8, 2010

(86) PCT No.: PCT/IB2010/000776
§ 371 (c)(1),
(2), (4) Date: Jan. 27, 2012

(87) PCT Pub. No.: WO2010/116242
PCT Pub. Date: Oct. 14, 2010

(65) Prior Publication Data
US 2012/0128510 A1    May 24, 2012

(30) Foreign Application Priority Data

Apr. 9, 2009  (IT) .............................. MI2009A0582

(51) Int. Cl.
*B01D 46/24* (2006.01)
*B01D 29/35* (2006.01)
(Continued)

(52) U.S. Cl.
CPC ............ *B01D 46/2411* (2013.01); *B01D 29/35* (2013.01); *B01D 35/14* (2013.01); *B01D 46/0005* (2013.01); *B01D 2201/403* (2013.01); *B01D 2201/44* (2013.01); *B01D 2265/06* (2013.01); *B01D 2271/022* (2013.01)
USPC ................................. 55/498; 55/502; 55/507

(58) Field of Classification Search
CPC .... B01D 29/35; B01D 35/14; B01D 46/0005; B01D 46/2411; B01D 2201/403; B01D 2201/44; B01D 2265/06; B01D 2271/022
USPC .................................... 55/498, 525, 502, 507
See application file for complete search history.

(56) References Cited

U.S. PATENT DOCUMENTS

| 5,106,501 | A  |   | 4/1992  | Yang et al. |
| 6,110,368 | A  | * | 8/2000  | Hopkins et al. ............. 210/497.1 |
| 6,318,564 | B1 |   | 11/2001 | Archibald et al. |

(Continued)

FOREIGN PATENT DOCUMENTS

| DE | 102007058792 A1 | 6/2009 |
| EP | 0562501 A2 | 9/1993 |

(Continued)

OTHER PUBLICATIONS

JP 62004413 A English Abstract.*

(Continued)

*Primary Examiner* — Duane Smith
*Assistant Examiner* — Britanny Precht
(74) *Attorney, Agent, or Firm* — Sterne, Kessler, Goldstein & Fox P.L.L.C.

(57) ABSTRACT

A filter for filtering fluids, in particular gas in petrochemical plants, has: a tubular cartridge which extends along a first axis, is designed to filter a fluid, and has a first and second annular end; a casing, which is connectable to a conduit of a petrochemical plant, houses the tubular cartridge, and has a first and second end support; and an axial compensating ring located between the tubular cartridge and the first or second end support.

19 Claims, 5 Drawing Sheets

(51) Int. Cl.
*B01D 35/14* (2006.01)
*B01D 46/00* (2006.01)

(56) References Cited

U.S. PATENT DOCUMENTS

| | | | |
|---|---|---|---|
| 6,409,214 B2 * | 6/2002 | Katsuda et al. | 280/741 |
| 6,575,439 B1 | 6/2003 | Costello et al. | |
| 6,751,814 B2 * | 6/2004 | Mattson et al. | 4/504 |
| 2002/0040870 A1 * | 4/2002 | Paul | 210/437 |
| 2003/0213059 A1 | 11/2003 | Mattson, Jr. et al. | |
| 2004/0221381 A1 * | 11/2004 | Mattson et al. | 4/541.1 |
| 2005/0081287 A1 * | 4/2005 | Mattson et al. | 4/541.1 |
| 2005/0211623 A1 * | 9/2005 | Moscaritolo et al. | 210/440 |
| 2006/0112668 A1 * | 6/2006 | Gieseke et al. | 55/482 |
| 2006/0137316 A1 * | 6/2006 | Krull et al. | 55/498 |
| 2013/0146525 A1 * | 6/2013 | Parcell et al. | 210/348 |

FOREIGN PATENT DOCUMENTS

| | | | |
|---|---|---|---|
| EP | 1674777 A1 | 6/2006 | |
| GB | 938518 A | 10/1963 | |
| GB | 2282980 A | 4/1995 | |
| JP | 62004413 A * | 1/1987 | B01D 35/02 |
| JP | 2005-144226 A | 6/2005 | |

OTHER PUBLICATIONS

International Search Report and Written Opinion for International Appl. No. PCT/IB2010/000776, European Patent Office, mailed on Apr. 10, 2010, 8 pages.

International Preliminary Report or Patentability for International Appl. No. PCT/IB2010/000776, European Patent Office, mailed Mar. 23, 2011, 10 pages.

* cited by examiner

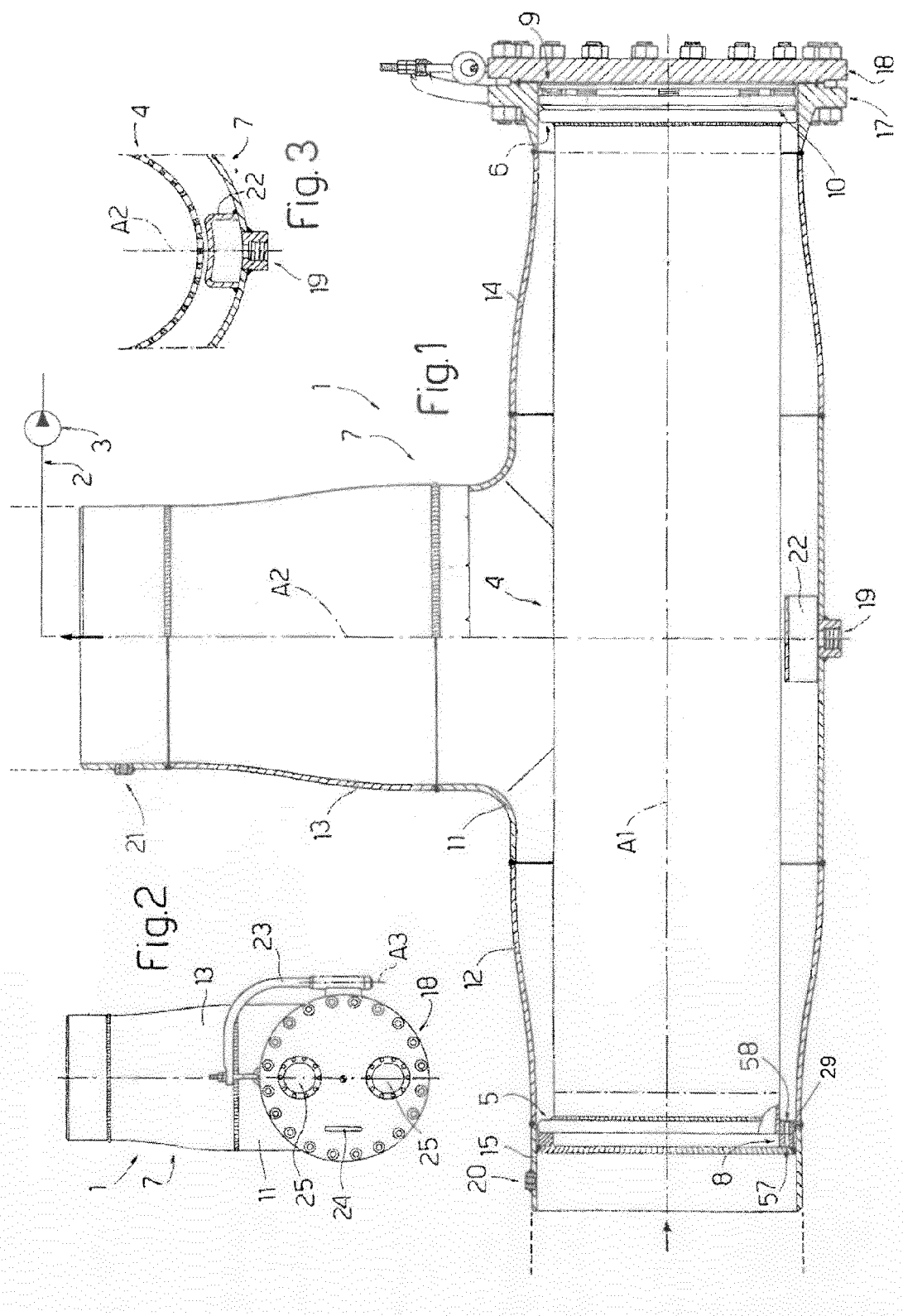

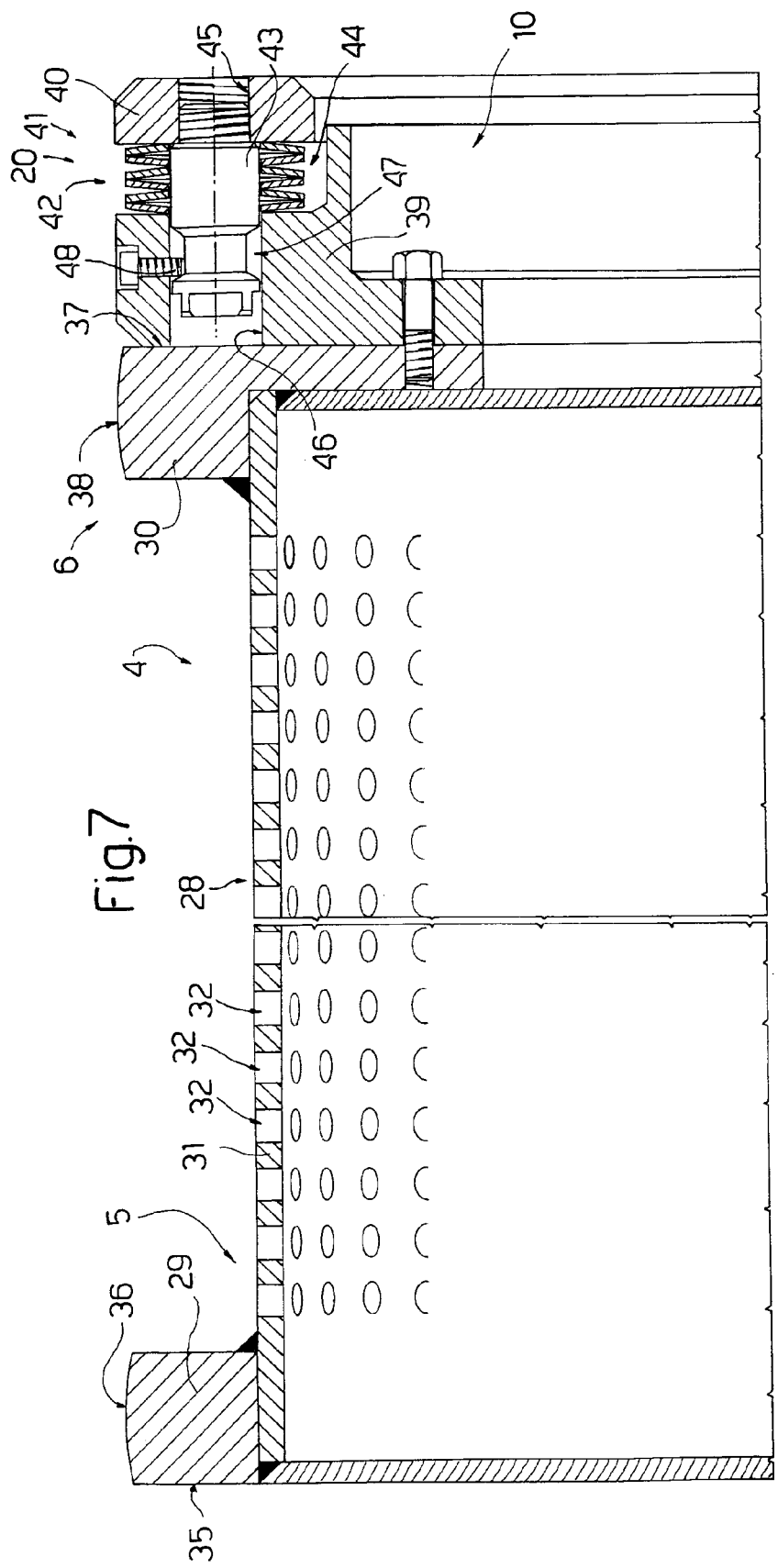
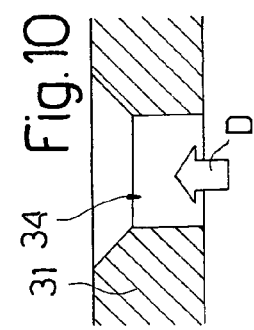
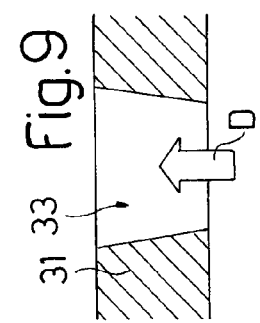
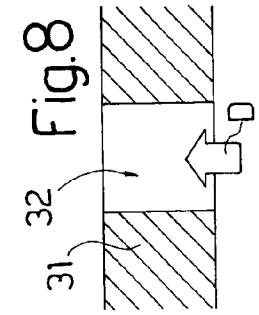

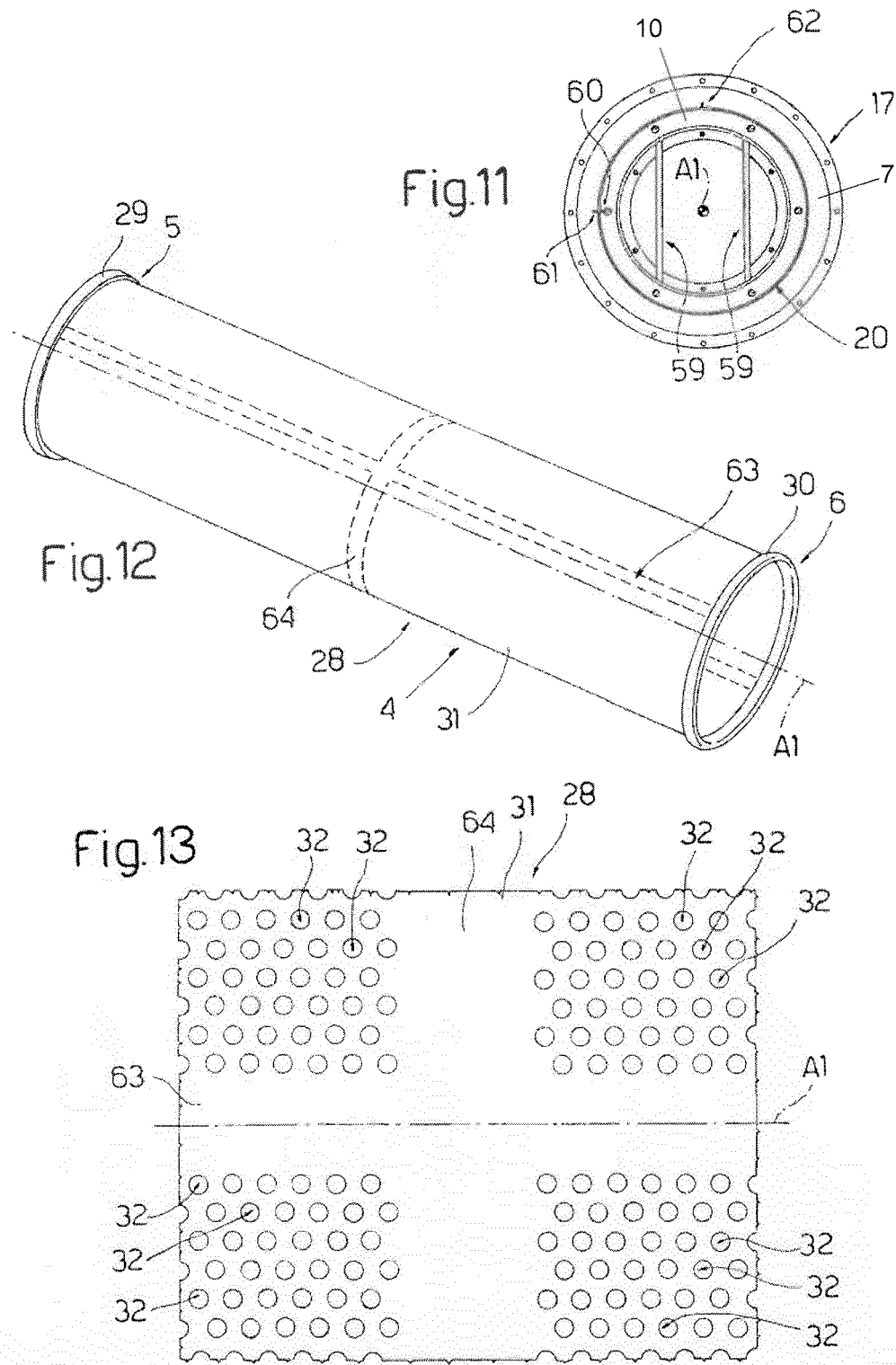

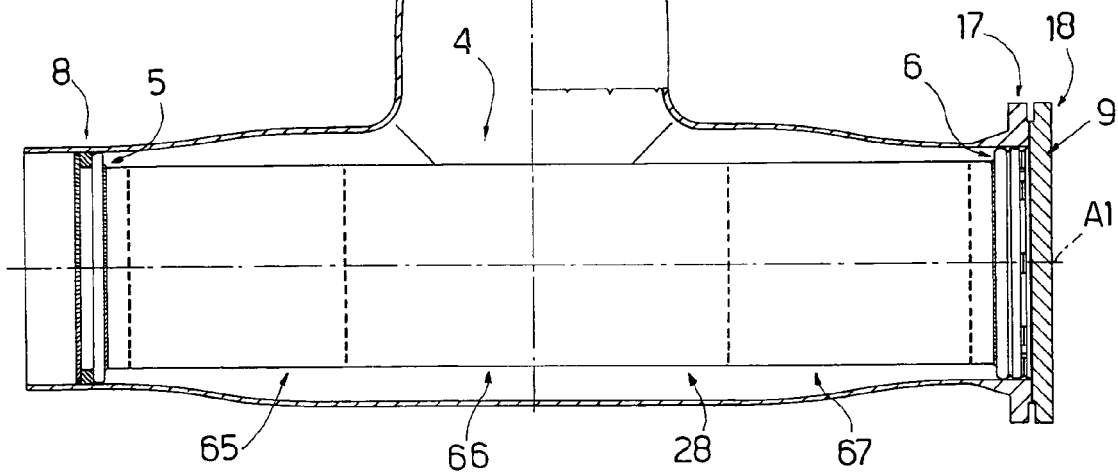

US 8,961,643 B2

FLUID FILTER, IN PARTICULAR FOR PETROCHEMICAL PLANT GAS

TECHNICAL FIELD

The present invention relates to a fluid filter, in particular for filtering petrochemical plant gas.

BACKGROUND ART

More specifically, the present invention relates to a filter comprising a tubular cartridge extending along an axis and for filtering fluid; and a casing connectable to a petrochemical plant conduit and housing the tubular cartridge.

Filters of the above type are normally used for filtering propane, butane, syngas, or other gases, and serve to filter out solid particles that could damage plant equipment downstream from the filter.

The filter is subjected to severe stress by the enormous volume of gas to be filtered, by temperature changes, and by the pressure of the gas. To give an idea of the conditions under which the filter operates, suffice it say that flow may reach as much as 50,000 cubic meters an hour, pressure may be as high as 200 bars, and temperature may range between −50° C. and 160° C.

The filter, and particularly the tubular cartridge, are therefore subjected to extreme thermal and mechanical stress. Mechanical stress is also produced by the gas flow assuming a strong turbulent component at the filter, which seriously stresses the tubular cartridge.

DISCLOSURE OF THE INVENTION

One object of the present invention is to provide a filter designed to withstand the severe stress to which it is subjected over its working life.

Another object of the present invention is to provide a filter that is easy to produce and install.

According to the present invention, there is provided a filter for filtering fluids, in particular gas, in petrochemical plants, and which comprises:

a tubular cartridge, which extends along a first axis, is designed to filter a fluid, and comprises a first and second annular end;

a casing, which is connectable to a conduit of a petrochemical plant, houses said tubular cartridge, and comprises a first and second end support; and an axial compensating ring located between the tubular cartridge and the first or second end support; the filter being characterized in that the tubular cartridge comprises a self-supporting metal tube having a wall with a number of holes arranged unevenly along so as to define, along the wall of the metal tube, at least one longitudinal strip parallel to the first axis and with no holes, and at least one annular strip with no holes, so as to strengthen the metal tube.

The axial compensating ring between the tubular cartridge and the casing thus compensates for the difference in thermal expansion of the casing and the tubular cartridge; absorbs any shock or relative movement between the tubular cartridge and the casing; and, at the same time, pre-compresses the tubular cartridge in the work position inside the casing. Moreover, the annular shape of the compensating ring requires no ties extending along the first axis; and the tubular cartridge and the axial compensating ring are extremely easy to assemble.

BRIEF DESCRIPTION OF THE DRAWINGS

A non-limiting embodiment of the present invention will be described by way of example with reference to the accompanying drawings, in which:

FIG. 1 shows a side view, partly in longitudinal section and with parts removed for clarity, of the filter according to the present invention;

FIG. 2 shows a smaller-scale end view of the FIG. 1 filter;

FIG. 3 shows a cross section of a detail of the FIG. 2 filter;

FIG. 7 shows a longitudinal section, with parts removed for clarity, of component parts of the FIG. 1 filter;

FIG. 8 shows a larger-scale section of a detail in FIG. 7;

FIGS. 9 and 10 show larger-scale sections of two variations of the FIG. 8 detail;

FIG. 11 shows an end view of a detail of the FIG. 1 filter;

FIG. 12 shows a view in perspective, with parts removed for clarity, of a component part of the FIG. 1 filter;

FIG. 13 shows a larger-scale view of a detail in FIG. 11;

FIGS. 14 and 15 show longitudinal sections, with parts removed for clarity, of the FIG. 1 filter.

BEST MODE FOR CARRYING OUT THE INVENTION

Figure 4:
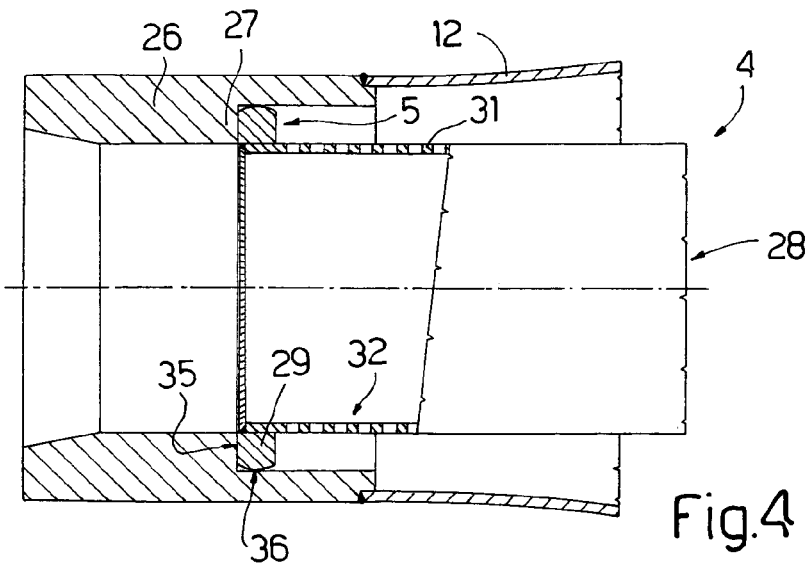
FIG. 4 shows a longitudinal section, with parts removed for clarity, of a detail of the FIG. 1 filter in accordance with a first variation of the present invention.

Number 1 in FIG. 1 indicates a filter for filtering fluid, in particular gas. FIG. 1 shows schematically a conduit 2 for supplying a compressor 3 of a petrochemical plant with gas; and filter 1 is installed along and forms part of conduit 2, and serves to separate from the gas flow any solid particles that could damage compressor 3. Filter 1 comprises a tubular cartridge 4 which extends along a longitudinal axis A1, filters the gas, and comprises two annular ends 5, 6; a casing 7 which is connectable to conduit 2, houses tubular cartridge 4, and comprises two end supports 8, 9; and an axial compensating ring 10 located between tubular cartridge 4 and end supports 8 and 9. In the FIG. 1 example, axial compensating ring 10 is located between annular end 6 and end support 9.

Casing 7 is substantially inverted-T-shaped, extends along axis A1 and an axis A2 perpendicular to axis A1, and comprises a number of tubular members joined to one another. In the example shown, the tubular members are welded to one another, and comprise a central T fitting 11; three reducers 12, 13, 14 welded to fitting 11; and a tube 15 welded to reducer 12.

Casing 7 also comprises a flange 17 welded to reducer 14; and a blank flange 18 fitted by screws to flange 17 and comprising a portion defining end support 9. In FIG. 1, end support 8 is defined by a metal ring welded to tube 15.

Casing 7 has an opening 19 (closed by a bolt not shown in FIG. 1) in the bottommost part of filter 1 to drain off any condensation; an opening 20, upstream from tubular cartridge 4, for receiving a first pressure gauge (not shown); and an opening 21, downstream from tubular cartridge 4, for receiving a second pressure gauge (not shown).

Filter 1 comprises a saddle 22 located over opening 19, and which provides for supporting tubular cartridge 4 as it is inserted into and removed from casing 7. In actual use, and as shown more clearly in FIG. 3, tubular cartridge 4 does not contact saddle 22.

Tubular cartridge 4 can be extracted through flange 17, after removing blank flange 18 from flange 17. For easy removal of blank flange 18, filter 1 comprises an arc-shaped arm 23 which, as shown more clearly in FIG. 2, supports blank flange 18 and is fitted to casing 7 to rotate about a vertical axis A3.

As shown in FIG. 2, blank flange 18 also comprises a handle 24 and two inspection windows 25.

In the FIG. 4 variation, tube 15 and end support 8 are replaced with a tube 26, in which an end support 27 is machined, and which has a relatively thick wall that can be turned internally.

With reference to FIG. 7, tubular cartridge 4 is connected by screws to axial compensating ring 10 to form a one-piece cartridge-ring assembly.

In the example shown, tubular cartridge 4 comprises a metal tube 28; and two rings 29, 30 welded to the free ends of tube 28 to define annular ends 5, 6 of tubular cartridge 4. Tube 28 comprises a wall 31, in which constant-diameter holes 32 are formed, as shown more clearly in FIG. 8.

In the FIG. 9 variation, wall 31 has holes 33 flaring in the flow direction D, i.e. radially outwards of tube 28.

In the FIG. 10 variation, wall 31 has holes 34, each of which comprises a first constant-diameter portion, and a second portion flaring in flow direction D.

With reference to FIG. 7, ring 29 is fixed to the outside of tube 28, and comprises an annular end face 35; and a toroidal face 36 for ensuring smooth insertion and removal of the cartridge. Similarly, ring 30 comprises an annular end face 37 and a toroidal face 38.

Axial compensating ring 10 comprises two rings 39, connected to each other, to slide in a direction parallel to axis A1 (FIG. 1), by an elastic connecting device 41 comprising a number of connecting modules 42 equally spaced along rings 39, 40 and about axis A1 (FIG. 1).

Each connecting module 42 comprises a pin 43 fixed to ring 40 and connected to ring 39 to slide parallel to axis A1 (FIG. 1); and an elastic member 44 inserted between rings 39 and 40 and fitted about pin 43. In other words, pin 43 is parallel to axis A1 (FIG. 1), is screwed inside a threaded hole 45 in ring 40, and is fitted in sliding manner inside a hole 46 formed in ring 39 and facing hole 45.

Pin 43 comprises an annular groove 47; and connecting module 42 comprises a retainer 48 which projects inside hole 46 to engage part of annular groove 47, so that the travel of pin 43 is limited to the difference between the width of annular groove 47 and the width of retainer 48. In the FIG. 7 example, retainer 48 is a screw fitted to ring 39 and which projects inside hole 46, and elastic member 44 is defined by a series arrangement of Belleville washers.

The size of filter 1 may vary according to the gas flow rate, which means the size of casing 7 and tubular cartridge 4 may vary according to project requirements. Connecting modules 42, on the other hand, remain unchanged, and only vary in number alongside variations in the size of filter 1.

Figure 5:
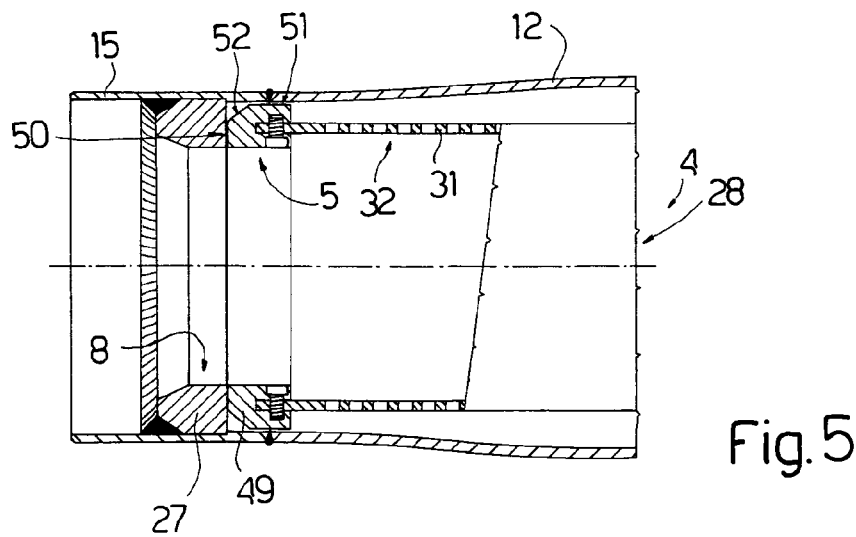
FIG. 5 shows a longitudinal section, with parts removed for clarity, of a detail of the FIG. 1 filter in accordance with a second variation of the present invention.

In the FIG. 5 variation, ring 29 is replaced with a ring 49 fixed by screws to tube 28 and comprising a groove into which the end of tube 28 is inserted; and the screws are fitted through ring 49 and wall 31 of tube 28. Ring 49 comprises an end wall 50; a cylindrical outer wall 51; and a sloping wall 52 defined by a bevel between end wall 50 and cylindrical outer wall 51.

Figure 6:
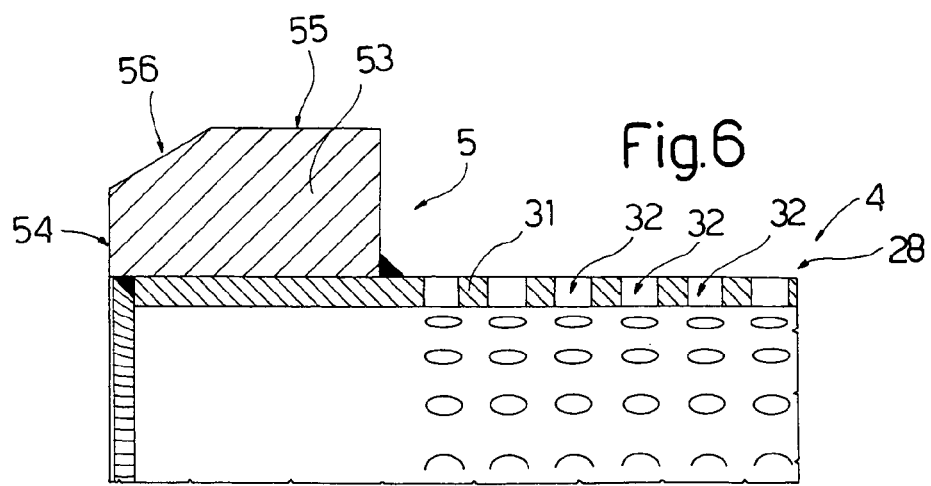
FIG. 6 shows a longitudinal section, with parts removed for clarity, of a detail of the FIG. 1 filter in accordance with a third variation of the present invention.

In the FIG. 6 variation, ring 29 is replaced with a ring 53 welded to wall 31 of tube 28, and comprising an end wall 54; a cylindrical outer wall 55; and a sloping wall 56 defined by a bevel between end wall 54 and cylindrical outer wall 55.

With reference to FIG. 1, end support 8 and ring 29 comprise respective holes 57 and 58, which, in use, are aligned to direct any condensation forming inside tube 15 to opening 19.

Accordingly, tubular cartridge 4 can be oriented selectively about axis A1 by means of two handles 59 fitted to axial compensating ring 10 as shown in FIG. 11; and axial compensating ring 10 and casing 7 have respective reference marks 60, 61 and 62 indicating given positions—in the example shown, two positions 90° apart—of tubular cartridge 4 with respect to casing 7, and in one of which two positions the holes 57 and 58 in FIG. 1 are aligned.

With reference to FIGS. 12 and 13, tube 28 has areas with no holes 32, so as to define, along wall 31 of tube 28, a solid longitudinal strip 63 parallel to axis A1, and a solid annular strip 64 about the middle of tube 28. Because tubular cartridge 4 is self-supporting, i.e. has no supporting frame, the structural rigidity of tubular cartridge 4 must be provided by tube 28, which in fact is the purpose of longitudinal strip 63 and annular strip 64. Depending on its size, tube 28 may even comprise numerous longitudinal strips 63 and annular strips 64.

With reference to FIG. 14, tube 28 comprises three adjacent tubular portions 65, 66, 67, wherein tubular portion 66 has a higher hole density than tubular portions 65 and 67, to reduce the turbulence in filter 1 and so reduce the stress exchanged between tubular cartridge 4 and casing 7.

With reference FIG. 15, tube 28 has a downward-facing sector 68; and a predominantly upward-facing sector 69 with a higher hole density than sector 68. This solution also provides for reducing turbulence of the fluid, and so reducing stress on tubular cartridge 4.

In actual use, the fluid is fed into tubular cartridge 4, and flows out through holes 32; any solid particles are retained inside tubular cartridge 4; and any condensation collects at the bottom of casing 7, and is drained off now and again through opening 19 when the petrochemical plant is idle.

In actual use, blank flange 18 pre-compresses axial compensating ring 10 against the tubular cartridge, thus making it possible to compensate for the difference in thermal expansion, and absorb any shock, between tubular cartridge 4 and casing 7.

Clearly, changes may be made to the present invention as described herein without, however, departing from the scope of the accompanying Claims.

The invention claimed is:

1. A filter for filtering fluids in petrochemical plants comprising:
   a tubular cartridge, which extends along a first axis, configured to filter a fluid, and comprising a first annular end and a second annular end;
   a casing, which is connectable to a conduit of a petrochemical plant, housing said tubular cartridge, and comprising a first end support and a second end support;
   and an axial compensating ring located between the tubular cartridge and the first end support or the second end support,
   wherein the tubular cartridge comprises a self-supporting metal tube having a wall with a number of holes arranged unevenly so as to define, along the wall of the metal tube, at least one longitudinal strip parallel to the first axis and with no holes, and at least one annular strip with no holes so as to strengthen the metal tube,
   wherein the number of holes comprises a first plurality of holes between the annular strip and a first annular end of the metal tube, and a second plurality of holes between the annular strip and a second annular end of the metal tube.

2. A filter as claimed in claim 1, wherein the axial compensating ring comprises a first ring and a second ring connected axially to each other in sliding manner by an elastic connecting device.

3. A filter as claimed in claim 2, wherein the elastic connecting device comprises a number of connecting modules equally spaced along the first ring and the second ring and about the first axis.

4. A filter as claimed in claim 3, wherein each connecting module comprises
 a pin fixed to the second ring, connected to the first ring, and configured to slide parallel to the first axis; and
 an elastic member inserted between the first ring and the second ring and fitted about the pin.

5. A filter as claimed in claim 4, wherein each connecting module comprises means for limiting travel of said pin with respect to the first ring; said means for limiting travel of the pin comprising an annular groove in said pin, and a retainer fixed to the first ring and which partly engages said annular groove, so that said travel is limited by the size, parallel to the first of the annular groove and the retainer.

6. A filter as claimed in claim 1, wherein said axial compensating ring is fixed to the tubular cartridge to form a cartridge-ring assembly.

7. A filter as claimed in claim 1, wherein the first end support is welded to the casing.

8. A filter as claimed in claim 1, wherein the first end support is machined into the casing.

9. A filter as claimed in claim 1, wherein the casing comprises a blank flange which is removable to insert and remove the tubular cartridge along said first axis; the second end support being defined by a portion of said blank flange.

10. A filter as claimed in claim 1, wherein the metal tube comprises a first annular portion, a second annular portion, and a third annular portion adjacent to one another, and wherein the second portion is located between the first portion and the third portion; the second portion having a higher density of holes than the first portion and the third portion.

11. A filter as claimed in claim 1, wherein the tubular cartridge comprises a first longitudinal sector, and a second longitudinal sector adjacent to the first longitudinal sector; the second longitudinal sector having a higher density of holes than the first longitudinal sector.

12. A filter as claimed in claim 6, wherein the tubular cartridge is cylindrical and orientable selectively about the first axis; said tubular cartridge and the casing having respective reference marks indicating given positions of the tubular cartridge with respect to the casing.

13. A filter as claimed in claim 1, wherein the casing is inverted-T-shaped, and comprises a first tubular portion extending about the first axis and at least partly about the tubular cartridge, and a second portion extending about a second axis crosswise to the first axis.

14. A petrochemical plant comprising a compressor; a conduit for feeding a fluid to said compressor; and a filter as claimed in claim 1.

15. A filter as claimed in claim 1, wherein the annular strip is substantially midway between the first annular end and the second annular end of the metal tube.

16. A filter as claimed in claim 1, wherein each hole of the number of holes is uniformly shaped and sized.

17. A filter for filtering fluids in petrochemical plants, comprising:
 a tubular cartridge, which extends along a first axis, configured to filter a fluid, and comprising a first annular end and a second annular end;
 a casing, which is connectable to a conduit of a petrochemical plant, housing said tubular cartridge, and comprising a first end support and a second end support; and
 an axial compensating ring located between the tubular cartridge and the first end support or the second end support;
 wherein the tubular cartridge comprises a self-supporting metal tube having a wall with a number of holes arranged unevenly so as to define, along the wall of the metal tube, at least one longitudinal strip parallel to the first axis and with no holes, and at least one annular strip with no holes, so as to strengthen the metal tube;
 wherein the axial compensating ring comprises a first ring and a second ring connected axially to each, other in sliding manner by an elastic connecting device;
 wherein the elastic connecting device comprises a number of connecting modules equally spaced along the first ring and the second ring and about the first axis;
 wherein each connecting module comprises
  a pin fixed to the second ring, connected to the first ring, and configured to slide parallel to the first axis, and
  an elastic, member inserted between the first ring and the second ring and fitted about the pin; and
 wherein each connecting module comprises means for limiting travel of said pin with respect to the first ring, said means for limiting travel of the pin comprising
  an annular groove in said pin, and
  a retainer fixed to the first ring and which partly engages said annular groove, so that said travel is limited by the size, parallel to the first axis, of the annular groove and the retainer.

18. A filter for filtering fluids in petrochemical plants, comprising:
 a tubular cartridge, which extends along a first axis, configured to filter a fluid, and comprising a first annular end and a second annular end;
 a casing, connectable to a conduit of a petrochemical plant, housing said tubular cartridge, and comprising a first end support and a second end support; and
 an axial compensating ring located between the tubular cartridge and the first end support or the second end support,
 wherein the tubular cartridge comprises a self-supporting metal tube having a wall with a number of holes arranged unevenly so as to define, along the wall of the metal tube, at least one longitudinal strip parallel to the first axis and with no holes, and at least one annular strip with no holes, so as to strengthen the metal tube, and
 wherein the first end support is welded to the casing.

19. A filter for filtering fluids in petrochemical plants comprising:
 a tubular cartridge, which extends along a first axis, configured to filter a fluid, and comprising a first annular end and a second annular end;
 a casing, which is connectable to a conduit of a petrochemical plant, housing said tubular cartridge, and comprising a first end support and a second end support;
 and an axial compensating ring located between the tubular cartridge and the first end support or the second end support,
 wherein the tubular cartridge comprises a self-supporting metal tube having a wall with a number of holes arranged unevenly so as to define, along the wall of the metal tube, at least one longitudinal strip parallel to the first axis and with no holes, and at least one annular strip with no holes so as to strengthen the metal tube,
wherein the annular strip is substantially midway between a first annular end and a second annular end of the metal tube.

* * * * *